United States Patent
Bansal et al.

(10) Patent No.: US 12,511,480 B2
(45) Date of Patent: Dec. 30, 2025

(54) PATTERN RECOGNITION USING NLP-BASED TOKENIZING AND CLUSTERING MODELS

(71) Applicant: Bank of America Corporation, Charlotte, NC (US)

(72) Inventors: Nitin Bansal, Hisar (IN); Kapil Juneja, Jaipur (IN); Rajalakshmi Arumugam, Chennai (IN); Kumaraguru Mohan, Perungalathur (IN); Venkatesh Polneedi, Hyderabad (IN); Anil Garg, Gurugram (IN); Gaurav Kumar Kashyap, Delhi (IN)

(73) Assignee: Bank of America Corporation, Charlotte, NC (US)

( * ) Notice: Subject to any disclaimer, the term of this patent is extended or adjusted under 35 U.S.C. 154(b) by 220 days.

(21) Appl. No.: 18/449,492

(22) Filed: Aug. 14, 2023

(65) Prior Publication Data

US 2025/0061276 A1    Feb. 20, 2025

(51) Int. Cl.
*G06F 40/284* (2020.01)
*G06F 11/34* (2006.01)
*G06Q 40/04* (2012.01)

(52) U.S. Cl.
CPC ........ *G06F 40/284* (2020.01); *G06F 11/3476* (2013.01); *G06Q 40/055* (2025.08)

(58) Field of Classification Search
CPC .. G06F 40/284; G06F 11/3476; G06Q 40/055
See application file for complete search history.

(56) References Cited

U.S. PATENT DOCUMENTS

| | | |
|---|---|---|
| 10,332,012 B2 | 6/2019 | Reddy |
| 10,431,214 B2 * | 10/2019 | Guo ................. G06F 40/237 |
| 10,552,834 B2 | 2/2020 | Dimmick et al. |
| 10,733,614 B2 | 8/2020 | Sapoznik et al. |
| 10,949,825 B1 | 3/2021 | Brosamer et al. |
| 11,003,796 B2 | 5/2021 | Tucker et al. |

(Continued)

FOREIGN PATENT DOCUMENTS

| | | | | |
|---|---|---|---|---|
| KR | 20230110950 A | * | 7/2023 | ......... G06F 16/9538 |
| WO | WO-2024049265 A1 | * | 3/2024 | |

*Primary Examiner* — Daniel C Washburn

(57) ABSTRACT

A system for interaction pattern recognition receives an input primary interaction and accesses clusters indicating interaction group patterns. Each cluster includes a respective primary interaction and secondary interactions linked to that primary interaction. Each cluster is identified by a respective non-fungible token. The system then determines a non-fungible token of the input primary interaction, compares it to the non-fungible tokens of the clusters, selects a first cluster based on a match between the non-fungible token of the input primary interaction and a first non-fungible token identifying the first cluster, determines the secondary interactions in the first cluster as linked to the input primary interaction, retrieves the secondary interactions from the clusters, generates a recommended group of interactions including the input primary interaction and the retrieved secondary interactions, and provides the recommended group of interactions and an indication that the retrieved secondary interactions are linked to the input primary interaction.

18 Claims, 5 Drawing Sheets

(56) References Cited

U.S. PATENT DOCUMENTS

| | | | |
|---|---|---|---|
| 11,258,807 | B2 | 2/2022 | Muddu et al. |
| 11,599,960 | B2 * | 3/2023 | Groth et al. |
| 12,153,794 | B2 * | 11/2024 | Akkapeddi ............... G06F 3/06 |
| 12,175,454 | B1 * | 12/2024 | Kurani ............... G06Q 20/3827 |
| 12,326,801 | B2 * | 6/2025 | Bussa ..................... G06F 8/34 |
| 2018/0096362 | A1 | 4/2018 | Kwan |
| 2019/0295119 | A1 | 9/2019 | Basu et al. |
| 2020/0257666 | A1 | 8/2020 | Chetia et al. |
| 2020/0342968 | A1 * | 10/2020 | Avinash ................. G16H 50/30 |
| 2020/0389495 | A1 | 12/2020 | Crabtree et al. |
| 2021/0271508 | A1 * | 9/2021 | Lee ..................... G06Q 20/405 |
| 2022/0004927 | A1 | 1/2022 | Cella |
| 2022/0101323 | A1 | 3/2022 | Acuña-Rohter |
| 2022/0383303 | A1 | 12/2022 | Mullen et al. |
| 2022/0400150 | A1 | 12/2022 | Bade |
| 2022/0405381 | A1 | 12/2022 | Ortiz et al. |
| 2023/0334472 | A1 * | 10/2023 | Pene ................. G06Q 20/0655 |
| 2024/0037620 | A1 * | 2/2024 | Fetman ............... G06Q 30/0609 |
| 2024/0370850 | A1 * | 11/2024 | Quigley ............... G06Q 20/367 |
| 2024/0378649 | A1 * | 11/2024 | Corin ..................... G06Q 40/08 |
| 2025/0139520 | A1 * | 5/2025 | Taylor ............... G06F 16/24578 |

* cited by examiner

PATTERN RECOGNITION USING NLP-BASED TOKENIZING AND CLUSTERING MODELS

TECHNICAL FIELD

The present disclosure relates generally to pattern recognition, and more specifically, to pattern recognition using natural language processing-based tokenizing and clustering models.

BACKGROUND

To accurately conduct a primary interaction, all secondary interactions related to the primary interaction need to be reliably identified and managed. However, the number of these interactions are large, which leads to the consumption of additional processing and networking resources due to the need to handle these interactions separately. There is also no tracing method available to link these interactions with various evaluation metrics. In addition, existing systems handling interactions may generate various interaction entries depending on the rules pertaining to the original interaction. These interaction entries also cannot be traced. As can be seen, existing systems and methods are limited in their abilities to conduct interactions and establish traceability between these interactions.

SUMMARY

The system disclosed in the present application provides a technical solution to the problems discussed above by pattern recognition on interaction data using NLP-based tokenizing and clustering models. The disclosed system can identify and link primary interactions with secondary interactions that need to be accounted and processed together. The disclosed system can also predict secondary interactions which are yet to enter the log and are expected to be linked to a primary interaction using machine-learning technologies by establishing traceability between related groups of interactions that need to be processed in the same batch. The system uses an NLP engine to identify and tag the type of every primary interaction as a non-fungible token (NFT) which is generated based on various functional key attributes of the primary interaction. The system also trains a deep-learning model on historical interaction data and uses the deep-learning model to generate pattern-recognition clusters containing the linkages between various primary interaction and their corresponding secondary interactions. With the pattern-recognition clusters in place, an analyst can place a request in a web service with details of a primary interaction. The system then analyzes the details of the primary interaction, and responds with a recommended cluster of primary-secondary interactions. The system can also provide the additional missing secondary interactions by comparing the recommended cluster with the interaction data in logs. Accounting and processing may be performed based on the responses from the system.

In one embodiment, the disclosed system for interaction pattern recognition includes a memory operable to store a plurality of clusters indicating interaction group patterns. The disclosed system further includes a processor that is operably coupled to the memory. The processor is configured to receive an input primary interaction via a web service executing on a user device. The processor is then configured to access the plurality of clusters indicating interaction group patterns from the memory. Each of the plurality of clusters may include a respective primary interaction and one or more secondary interactions linked to that primary interaction. The plurality of clusters may be identified by a plurality of non-fungible tokens, respectively. The processor is then configured to determine an interaction type associated with the input primary interaction and determine a non-fungible token associated with the input primary interaction based on the interaction type. The processor is then configured to compare the non-fungible token associated with the input primary interaction to the plurality of non-fungible tokens respectively identifying the plurality of clusters. The processor is further configured to select a first cluster from the plurality of clusters based on a match between the non-fungible token associated with the input primary interaction and a first non-fungible token identifying the first cluster. The processor is then configured to determine the one or more secondary interactions in the first cluster as linked to the input primary interaction and retrieve the one or more secondary interactions linked to the input primary interaction from the plurality of clusters. The processor is then configured to generate a recommended group of interactions including the input primary interaction and the one or more retrieved secondary interactions. The processor is further configured to provide the recommended group of interactions and an indication that the one or more retrieved secondary interactions are linked to the input primary interaction via the web service.

The processor of the disclosed system is further configured to access a plurality of historical data including at least a historical group of manually linked interactions for a first period of time. The manually linked interactions include one or more historical primary interactions and one or more historical secondary interactions linked to each of the one or more historical primary interactions. The processor is then configured to determine a respective interaction type associated with the historical primary interaction for each of the one or more historical primary interactions. The processor is then configured to determine a respective non-fungible token associated with the historical primary interaction based on the interaction type associated with that historical primary interaction for each of the one or more historical primary interactions. The processor is then configured to determine a plurality of patterns associated with the plurality of historical data based on an unsupervised deep-learning model including one or more graphical neural networks. The plurality of patterns may indicate a plurality of linkages between historical primary interactions and historical secondary interactions. The processor is further configured to generate the plurality of clusters by analyzing the plurality of patterns based on the unsupervised deep-learning model.

The processor of the disclosed system is further configured to access current interaction data from one or more logs. The processor is then configured to compare the recommended group of interactions with the current interaction data. The processor is then configured to predict one or more additional secondary interactions not yet received at the system based on the comparison. The one or more additional secondary interactions may be linked to the input primary interaction. The processor is further configured to provide the predicted one or more additional secondary interactions via the web service.

The processor of the disclosed system is further configured to encrypt the recommended group of interactions before providing the recommended group of interactions via the web service.

In one embodiment, the input primary interaction is associated with one or more attributes. Correspondingly, the non-fungible token associated with the input primary interaction includes a combination of one or more character-strings respectively representing the one or more attributes.

In one embodiment, determining the interaction type associated with the input primary interaction includes determining one or more attributes associated with the input primary interaction based on metadata associated with the input primary interaction by a natural-language processing (NLP) model. The NLP model is configured to output an interaction type based on one or more input attributes to the NLP model. Determining the interaction type associated with the input primary interaction further includes analyzing the one or more attributes by the NLP model to determine the interaction type associated with the input primary interaction.

Certain embodiments of the present disclosure may include some, all, or none of these advantages. These advantages and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
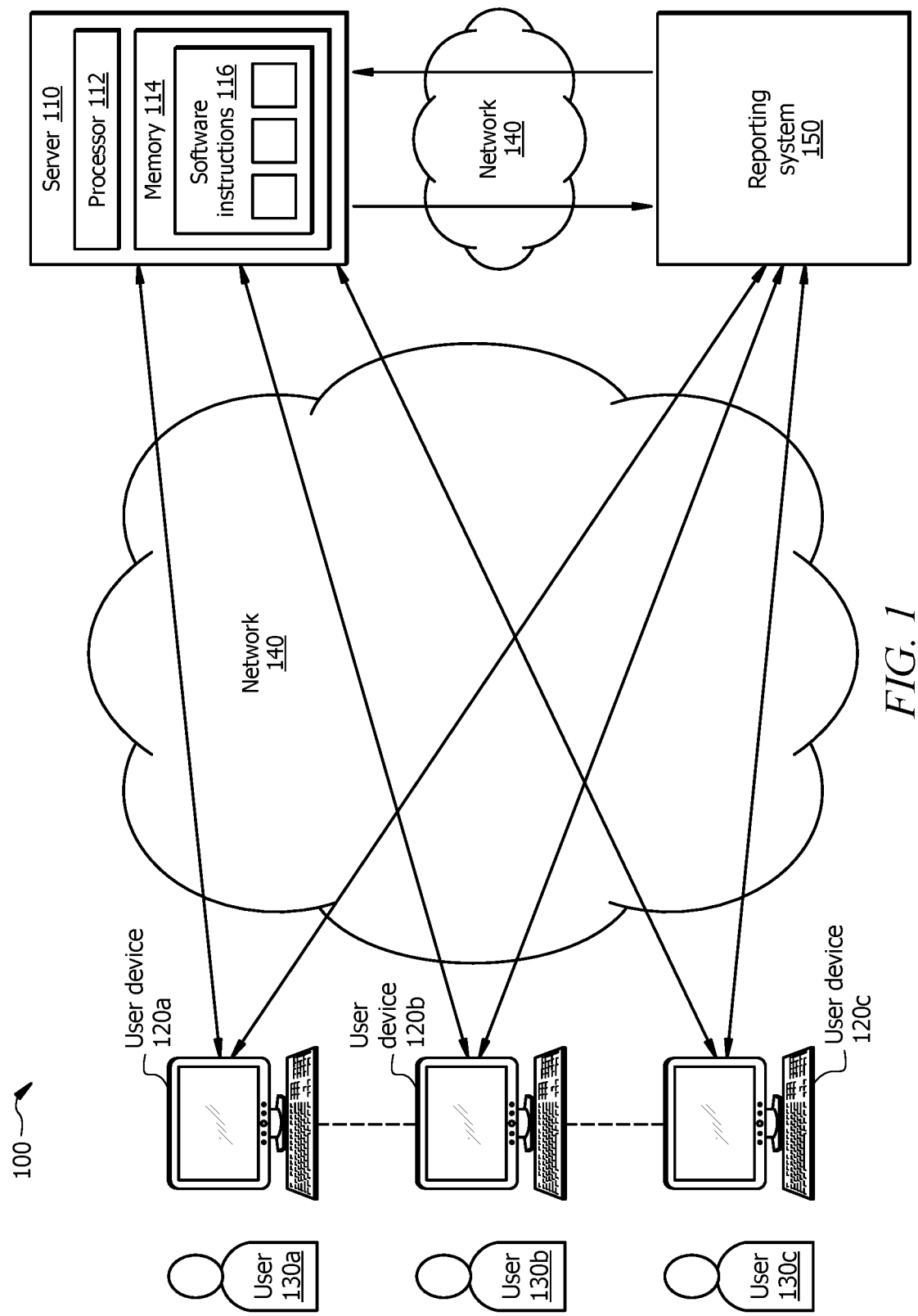
FIG. 1 illustrates one embodiment of a system configured to conduct interactions.
Figure 2A:
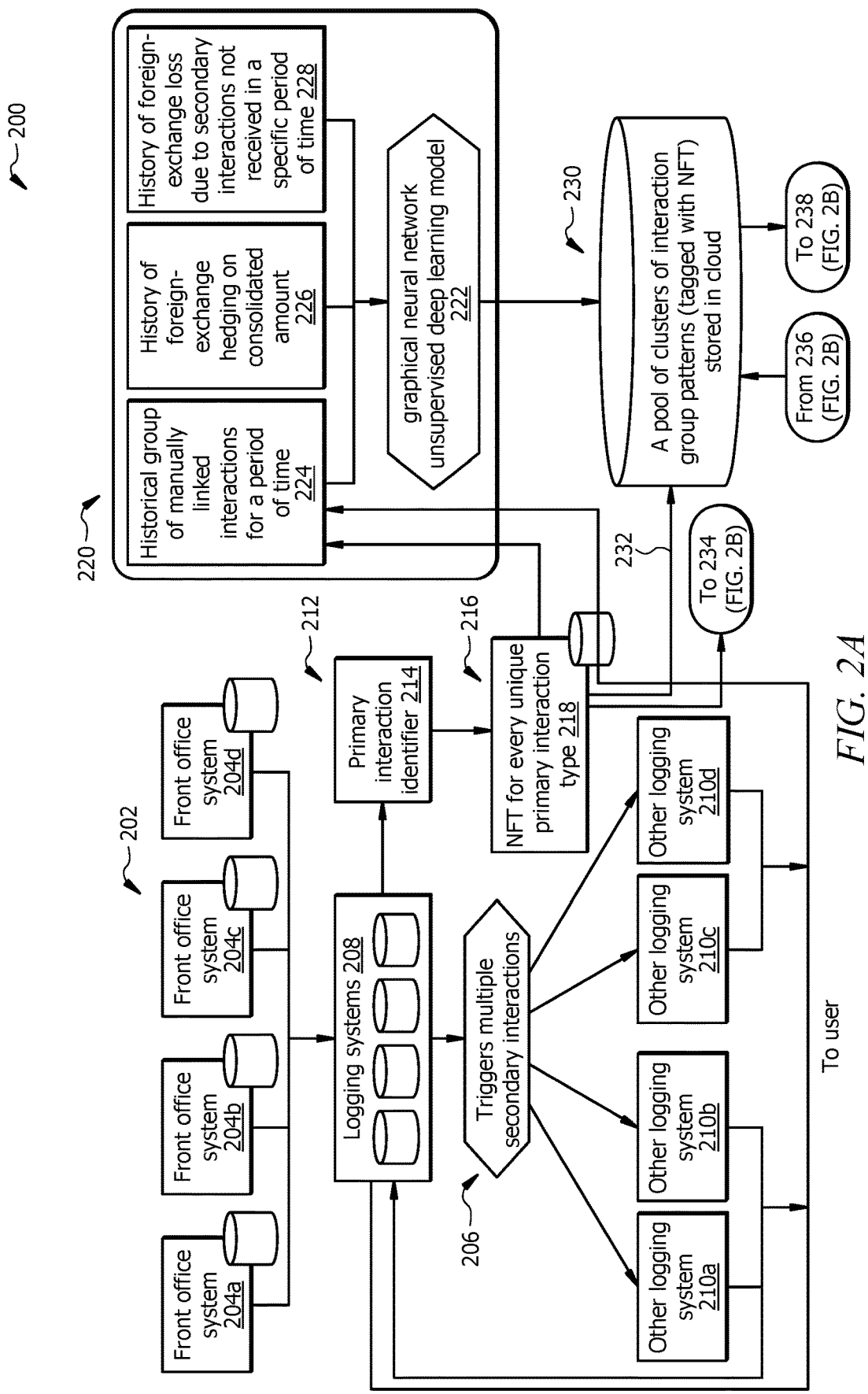
FIGS. 2A-2B illustrate an example operational flow of the system of FIG. 1.
Figure 2B:
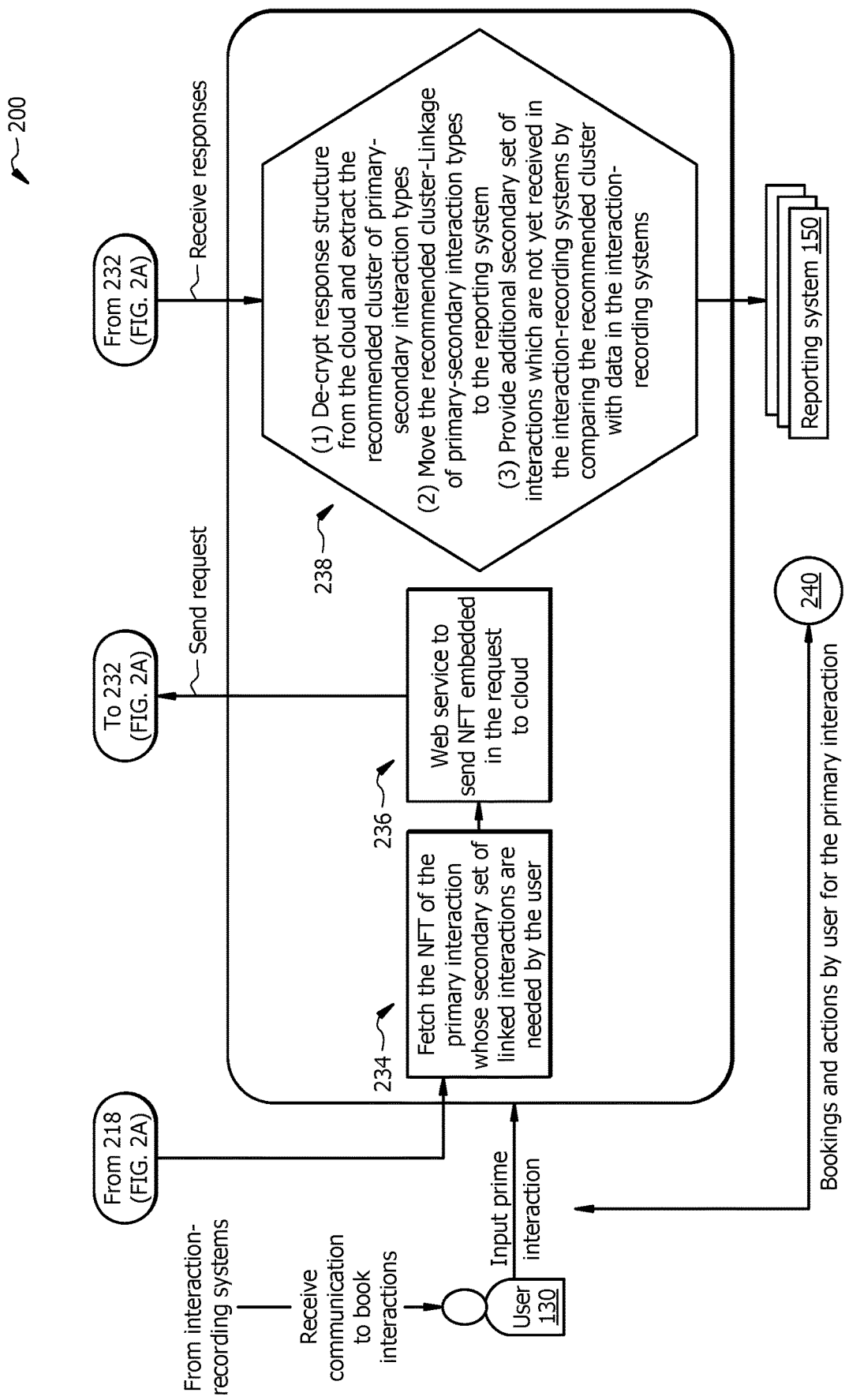
Figure 3A:
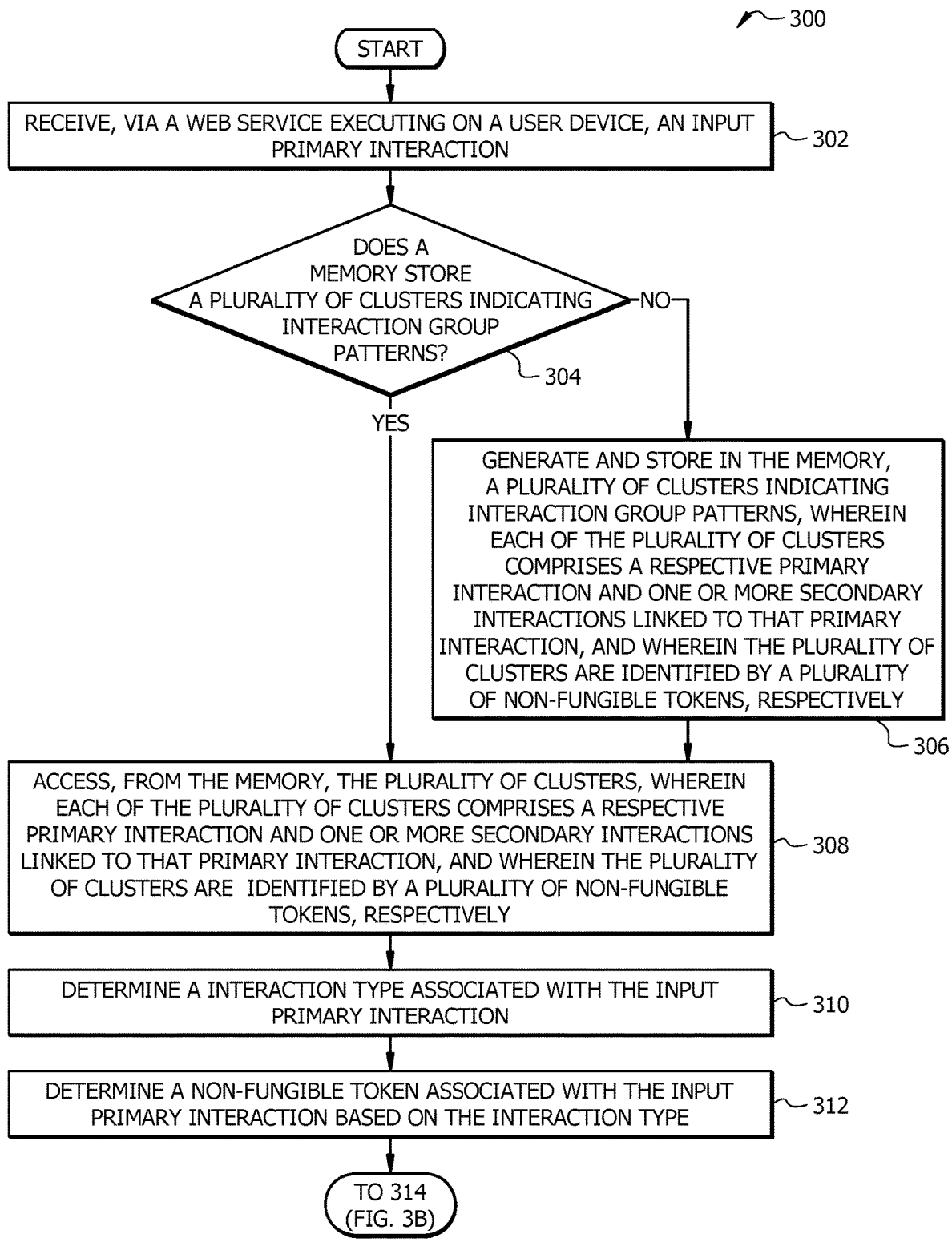
FIGS. 3A-3B illustrate an example flowchart of a method for conducting interactions.
Figure 3B:
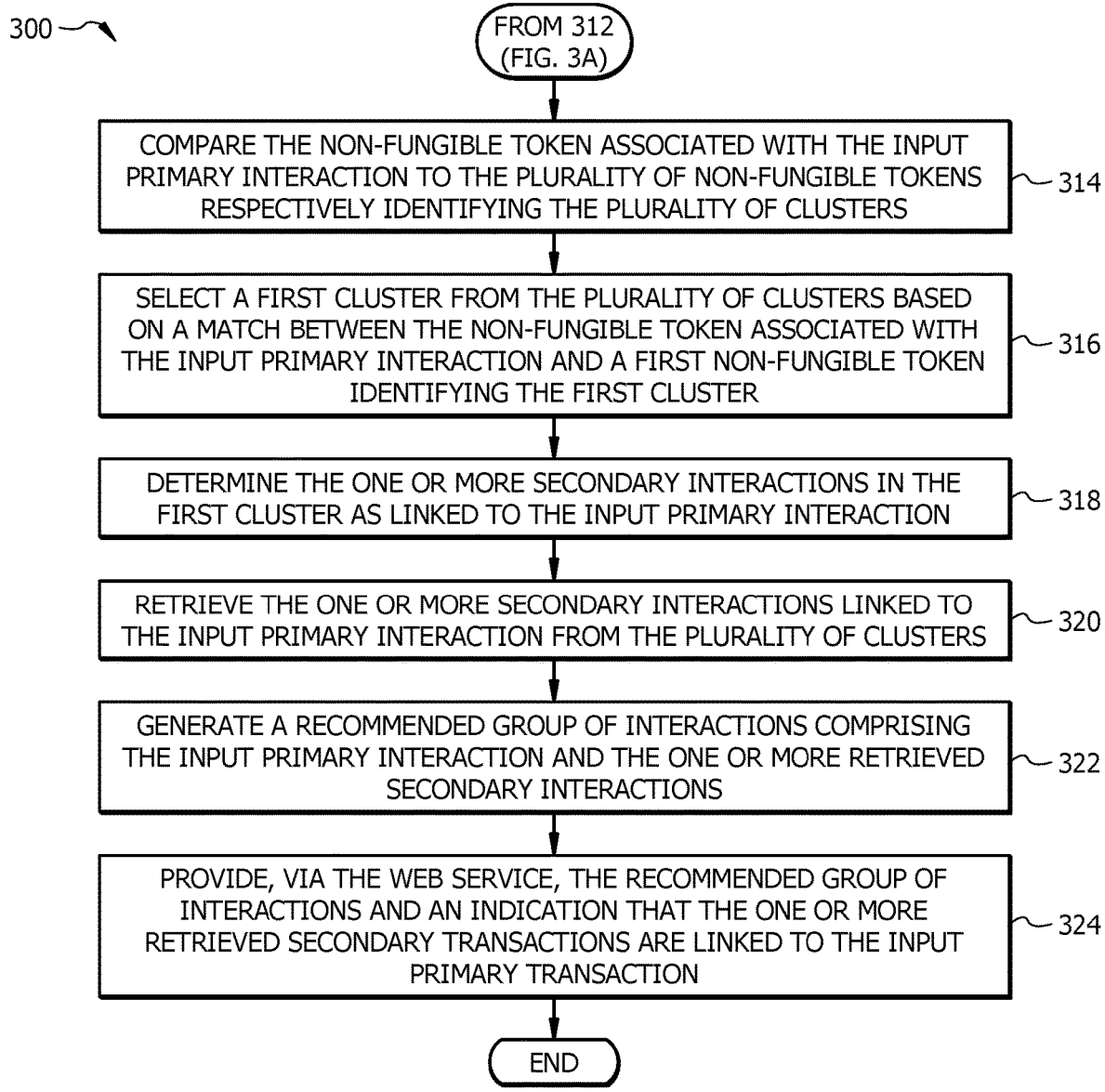

As described above, previous technologies fail to accurately conduct interactions and establish easy traceability between these interactions. This disclosure provides various systems and methods to accurately conduct interactions by pattern recognition on interaction data using NLP-based tokenizing and clustering models. FIG. 1 illustrates a system 100 configured to conduct interactions. FIGS. 2A-2B illustrate an operational flow 200 of the system 100 of FIG. 1. FIGS. 3A-3B illustrate a method 300 configured to conduct interactions.

Example System for Conducting Interactions

FIG. 1 illustrates one embodiment of a system 100 that is configured to conduct interactions. In one embodiment, system 100 comprises a server 110. In some embodiments, system 100 further comprises one or more user devices 120a-120c which may be used by one or more respective users 130a-130c to conduct interactions, a network 140 and a reporting system 150. Network 140 enables communications among components of the system 100. In other embodiments, system 100 may not have all of the components listed and/or may have other elements instead of, or in addition to, those listed above.

Server 110 comprises a processor 112 in signal communication with a memory 114. Memory 114 may store a plurality of clusters indicating interaction group patterns. Memory 114 also stores software instructions 116 that when executed by the processor 112, cause the processor 112 to perform one or more functions described herein. For example, when the software instructions 116 are executed, the processor 112 executes the software instructions 116 to: 1) receive, via a web service executing on a user device 120, an input primary interaction; 2) access the plurality of clusters indicating interaction group patterns from the memory 114; 3) determine an interaction type associated with the input primary interaction; 4) determine a non-fungible token associated with the input primary interaction based on the interaction type; 5) compare the non-fungible token associated with the input primary interaction to the plurality of non-fungible tokens respectively identifying the plurality of clusters; 6) select a first cluster from the plurality of clusters based on a match between the non-fungible token associated with the input primary interaction and a first non-fungible token identifying the first cluster; 7) determine the one or more secondary interactions in the first cluster as linked to the input primary interaction; 8) retrieve the one or more secondary interactions linked to the input primary interaction from the plurality of clusters; 9) generate a recommended group of interactions comprising the input primary interaction and the one or more retrieved secondary interactions; and 10) provide, via the web service, the recommended group of interactions and an indication that the one or more retrieved secondary interactions are linked to the input primary interaction.

System Components

User Devices

Examples of user devices 120 include, but are not limited to, computers, laptops, mobile devices (e.g., smart phones or tablets), servers, clients, or any other suitable type of device. The user device 120 is generally configured to send data and instructions for processing the data to the server 110 and reporting system 150. For example, the data may comprise an input primary interaction and the instructions may comprise a plurality of commands for processing the input primary interaction to identify related secondary interactions. In other examples, the data may comprise any suitable type of data. The instructions may comprise any suitable type or number of commands for processing the data. The user device 120 is further configured to receive responses based on processing results from the server 110 and reporting system 150.

Network

Network 140 may be any suitable type of wireless and/or wired network, including, but not limited to, all or a portion of the Internet, an Intranet, a private network, a public network, a peer-to-peer network, the public switched telephone network, a cellular network, a local area network (LAN), a metropolitan area network (MAN), a wide area network (WAN), and a satellite network. The network 140 may be configured to support any suitable type of communication protocol as would be appreciated by one of ordinary skill in the art.

Server

Server 110 is generally any device that is configured to process data and communicate with computing devices (e.g., user device 120), databases, systems, etc., via the network 140. The server 110 is generally configured to perform operations described further below in conjunction with the operational flow 200 of the system 100 described in FIGS. 2A-2B and method 300 described in FIGS. 3A-3B.

The server 110 comprises the processor 112 in signal communication with a network interface associated with network 140 and memory 114. The server 110 may be configured as shown, or in any other configuration.

Processor 112 comprises one or more processors operably coupled to the memory 114. The processor 112 is any electronic circuitry, including, but not limited to, state machines, one or more central processing unit (CPU) chips, logic units, cores (e.g., a multi-core processor), field-programmable gate arrays (FPGAs), application-specific integrated circuits (ASICs), or digital signal processors (DSPs). The processor 112 may be a programmable logic device, a microcontroller, a microprocessor, or any suitable combination of the preceding. The processor 112 is communicatively coupled to and in signal communication with a network interface associated with network 140 and memory 114. The one or more processors 112 are configured to process data. For example, the processor 112 may be 8-bit, 16-bit, 32-bit, 64-bit or of any other suitable architecture. The processor 112 may include an arithmetic logic unit (ALU) for performing arithmetic and logic operations, processor registers that supply operands to the ALU and store the results of ALU operations, and a control unit that fetches software instructions 116 from memory 114 and executes them by directing the coordinated operations of the ALU, registers and other components. The one or more processors 112 are configured to implement various software instructions 116. For example, the one or more processors 112 are configured to execute software instructions 116 to implement the functions disclosed herein, such as some or all of those described with respect to FIGS. 1-3. In some embodiments, the function described herein is implemented using logic units, FPGAs, ASICs, DSPs, or any other suitable hardware or electronic circuitry.

Memory 114 may be volatile or non-volatile and may comprise a read-only memory (ROM), random-access memory (RAM), ternary content-addressable memory (TCAM), dynamic random-access memory (DRAM), and static random-access memory (SRAM). Memory 114 may be implemented using one or more disks, tape drives, solid-state drives, and/or the like. Memory 114 is operable to store data clusters indicating interaction group patterns and the software, and/or any other data or software instructions 116. The software instructions 116 may comprise any suitable set of instructions, logic, rules, or code operable to execute the processor 112.

In an example scenario, assume that a user 130a wants to account and process a primary interaction. The user 130a, from the user device 120a, may send a request that indicates to identify and manage all secondary interactions related to the primary interaction to the server 110.

The server 110 processes the request and generates a response. In the example where the request indicates to identify and manage all secondary interactions related to the primary interaction, the response may include a recommended cluster of interactions including the primary interaction and its related secondary interactions. The response may additionally include additional secondary interactions not yet received at the system 100. In some cases, the server 110 may also communicate the recommended cluster of interactions to the reporting system 150.

Operational Flow

Conducting Interactions

FIGS. 2A-2B illustrate an example operational flow of the system of FIG. 1. Referring to FIG. 2A, the operational flow 200 may begin at operation 202, where various front office systems 204 record interactions in various functional metrics. At operation 206, these interactions enter multiple logging systems 208, which in turn triggers a set of secondary interactions. In particular embodiments, the secondary interactions may be associated with various interaction related actions. The primary interaction and these secondary interactions (triggered due to entry of primary interaction) are related to each other but are spread across other logging systems 210 (or sub-logging systems). These interactions may follow their own processing paths.

At operation 212, a natural-language processing (NLP) based system generates a primary interaction identifier 214. The primary interaction identifier identifies the primary interaction category/type from various combination of attributes associated with the primary interaction. As an example and not by way of limitation, the attributes may include global account information, cost center, entity, functionality of charges, etc. In particular embodiments, the NLP based system can identify the category/type for every single interaction. The NLP based system can determine whether an interaction is primary or secondary as these attributes are unique only to the primary interactions and secondary interactions may not have them.

At operation 216, a non-fungible token (NFT) generator assigns a non-fungible token for every unique primary interaction type based on the various attributes it represents as mentioned in operation 212. As an example and not by way of limitation, an example NFT may be "LedgerID-555+CostCenter8977+Entity-Asia+FunctionalCurrency-YEN+Purpose-TradeCharges".

At operation 220, the processor 112 uses machine learning to generate clusters of interactions indicating interaction group patterns. The processor 112 may use a graphical neural network unsupervised deep learning model 222 for pattern generation. In particular embodiments, the clusters may be created based on input from at least historical group of manually linked interactions for a period of time 224. In some embodiments, the clusters may be created based on input from additional sources. As an example and not by way of limitation, these additional sources may include history of foreign-exchange hedging on consolidated amount 226 and history foreign-exchange loss due to secondary interactions not received within the specific period of time 228. In particular embodiments, operation 220 may occur during the training phase of the graphical neural network unsupervised deep learning model.

At operation 230, output of operation 220 is used to create a pool of clusters of interaction group patterns indicating linkages between primary interactions and secondary interactions. In other words, each cluster comprises a set of primary-secondary interaction types. The pool of clusters are stored in the cloud computing system.

At operation 232, output of operation 218 is used to assign each cluster an NFT, which uniquely identifies the cluster.

Now referring to FIG. 2B, a user 130 receives communication from other logging systems 210 to book interactions. When the user 130 is ready to evaluate and book one or more primary interactions, the user 130 will input the corresponding primary interaction via their user device 120.

At operation 234, the processor 112 fetches the NFT of the primary interaction whose secondary set of linked interactions are needed by the user 130. The user is able to select the primary interaction and its related NFT.

At operation 236, the processor 112 embeds this NFT in the request from the user 130 and uses a web service to send the NFT embedded request to the pool of clusters of interaction group patterns on the cloud computing system. As can be seen, the processor 112 is not sending any information of the interaction itself. Instead, such information is represented by an NFT, which is a unique number embedded in the web service and sent to the pool of clusters. As a result, the embodiments disclosed herein improve the security of interaction processing with respect to data communication within a network environment.

The cloud computing system then analyzes the NFT embedded request in view of the pool of clusters of interaction group patterns and determines a recommended cluster of interaction group patterns. The cloud computing system will respond to the web service request received by providing the linkage of primary-secondary group patterns of interaction types from the cloud-based pool of clusters for the particular primary interaction requested.

At operation 238, a response engine receives responses from the cloud computing system. As an example and not by way of limitation, the response may be in JSON format. In particular embodiments, the response from the cloud computing system may be encrypted. Therefore, the response engine may firstly de-crypt the response structure from the cloud and extract the recommended cluster of primary-secondary interaction types. The response engine may then move the recommended cluster of primary-secondary interaction types to the reporting system 150. The response engine may further provide additional secondary set of interactions which are not yet received in the logging systems 210, but ideally are linked to the corresponding primary interaction by comparing the recommended cluster of primary-secondary interaction types with the current data in the logging systems 210 (which have not yet received some of the secondary interactions). In particular embodiments, the response engine may access current interaction data from one or more logs in the logging systems 210. The response engine may then compare the recommended group of interactions with the current interaction data. The response engine may then predict one or more additional secondary interactions not yet received at the system based on the comparison. The one or more additional secondary interactions are linked to the input primary interaction. The response engine may further provide, via the web service, the predicted one or more additional secondary interactions. This allows the user 130 to keep a placeholder for the additional interactions which are expected to flow in the near future for the primary interaction they are planning to book.

At operation 240, output from operation 238 that flows to the reporting system can be used by the user 130 to book all the interactions together, which match the recommended group of primary-secondary interaction types. As can be seen, the user can perform a variety of bookings and actions on them in one shot.

In one example embodiment, the operational flow 200 may be used to intelligently manage foreign-exchange risks and hedging. Every single transaction should be recorded, e.g., in accounting books (ledger) of an entity. The transactions may be categorized as local currency and foreign currency. All transactions which occur in foreign currency other than local currency may need to be converted into local currency using foreign-exchange rate. Existing conversion methods majorly calculate foreign-exchange gain or loss due to foreign-exchange rate differences and get recorded into accounting book. However, the number of these transactions are in millions and there is no tracing method available to link with generated foreign-exchange gain or loss. The operational flow 200 may solve the aforementioned issue. The processor 112 may identify and link primary transactions with the supplemental set of transactions which need to be booked and hedged together. The processor 112 may also predict the supplemental set of transactions which are yet to enter the ledgers and are expected to be linked to the primary transaction based on machine learning (e.g., unsupervised learning technology) by establishing easy traceability between related groups of transactions which need to be processed in the same batch. Every primary transaction type may be identified and tagged with a NFT, which is generated on the basis of various functional key attributes of the primary transaction. A deep learning model then output clusters containing the linkage between various secondary transactions and the primary transaction. Once analyst places a request in the booking system with details of a primary transaction, the recommended cluster of primary-secondary transaction types may be provided to the booking system via a reporting system. Additional missing set of secondary transactions may be identified by comparing the recommended cluster with data in ledgers. Analyst may then perform hedging based on the recommended cluster and the missing secondary transactions.

Example Method for Conducting Interactions

FIGS. 3A-3B illustrate an example flowchart of a method 300 for conducting interactions. Modifications, additions, or omissions may be made to method 300. Method 300 may include more, fewer, or other steps. For example, steps may be performed in parallel or in any suitable order. While at times discussed as the system 100, user device 120, server 110, processor 112, or components of any of thereof performing steps, any suitable system or components of the system may perform one or more steps of the method 300. For example, one or more steps of method 300 may be implemented, at least in part, in the form of software instructions (e.g., software instructions 116 of FIG. 1), stored on non-transitory, tangible, machine-readable media (e.g., memory 114 of FIG. 1) that when run by one or more processors (e.g., processor 112 of FIG. 1) may cause the one or more processors to perform steps 302-324.

Now referring to FIG. 3A, after start, the processor 112 of the server 110 receives an input primary interaction via a web service executing on a user device 120 at operation 302. The input primary interaction may be associated with one or more attributes.

At operation 304, the processor 112 determines whether the memory 114 stores a plurality of clusters indicating interaction group patterns. If the memory 114 does not store a plurality of clusters indicating interaction group patterns, the method proceeds to operation 306, where the processor 112 generates a plurality of clusters indicating interaction group patterns and stores them in the memory 114. Each of the plurality of clusters comprises a respective primary interaction and one or more secondary interactions linked to that primary interaction. In addition, the plurality of clusters are identified by a plurality of non-fungible tokens, respectively.

The processor 112 generates the plurality of clusters indicating interaction group patterns as follows. The processor 112 accesses a plurality of historical data comprising at least a historical group of manually linked interactions for a first period of time. The manually linked interactions comprise one or more historical primary interactions and one or more historical secondary interactions linked to each of the one or more historical primary interactions. The processor 112 then determines a plurality of patterns associated with the plurality of historical data based on an unsupervised deep-learning model comprising one or more graphical neural networks. In particular embodiments, the plurality of patterns indicate a plurality of linkages between historical primary interactions and historical secondary interactions. The processor 112 further generates the plurality of clusters by analyzing the plurality of patterns based on the unsupervised deep-learning model.

During the generation of the clusters indicating interaction group patterns, the processor 112 also determine a respective interaction type associated with the historical primary interaction for each of the one or more historical primary interactions. The processor 112 then determine a respective non-fungible token associated with the historical primary interaction for each of the one or more historical primary interactions based on the interaction type associated with that historical primary interaction.

If the memory 114 stores a plurality of clusters indicating interaction group patterns, the method proceeds to operation 308, where the processor 112 accesses the plurality of clusters indicating interaction group patterns from the memory 114. Each of the plurality of clusters may comprise a respective primary interaction and one or more secondary interactions linked to that primary interaction. In addition, the plurality of clusters may be identified by a plurality of non-fungible tokens, respectively.

At operation 310, the processor 112 determines a interaction type associated with the input primary interaction. In particular embodiments, determining the interaction type associated with the input primary interaction may be as follows. The processor 112 may determine one or more attributes associated with the input primary interaction by a natural-language processing (NLP) model based on metadata associated with the input primary interaction. The processor 112 may further analyze the one or more attributes by the NLP model to determine the interaction type associated with the input primary interaction. The NLP model is configured to output a interaction type based on one or more input attributes to the NLP model.

Now referring to FIG. 3B, at operation 312, the processor 112 determines a non-fungible token associated with the input primary interaction based on the interaction type. As an example and not by way of limitation, the non-fungible token associated with the input primary interaction may comprise a combination of one or more character-strings respectively representing the one or more attributes.

At operation 314, the processor 112 compares the non-fungible token associated with the input primary interaction to the plurality of non-fungible tokens respectively identifying the plurality of clusters.

At operation 316, the processor 112 selects a first cluster from the plurality of clusters based on a match between the non-fungible token associated with the input primary interaction and a first non-fungible token identifying the first cluster.

At operation 318, the processor 112 determines the one or more secondary interactions in the first cluster as linked to the input primary interaction.

At operation 320, the processor 112 retrieves the one or more secondary interactions linked to the input primary interaction from the plurality of clusters.

At operation 322, the processor 112 generates a recommended group of interactions comprising the input primary interaction and the one or more retrieved secondary interactions.

At operation 324, the processor 112 provide the recommended group of interactions and an indication that the one or more retrieved secondary interactions are linked to the input primary interaction via the web service. In this process, the processor 112 may encrypt the recommended group of interactions. After operation 324, method 300 ends.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated with another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112(f) as it exists on the date of filing hereof unless the words "means for" or "step for" are explicitly used in the particular claim.

The invention claimed is:

1. A system for interaction pattern recognition, comprising:
a memory operable to store historical interaction data; and
a processor, operably coupled to the memory, and configured to:
train a machine-learning model on the historical interaction data comprising at least a historical group of manually linked interactions for a first period of time, wherein the manually linked interactions comprise one or more historical primary interactions and one or more historical secondary interactions linked to each of the one or more historical primary interactions, the training of the machine-learning model automatically generating a plurality of clusters indicating interaction group patterns from the historical interaction data, wherein each of the plurality of clusters comprises a respective primary interaction and one or more secondary interactions linked to that primary interaction;
generate a plurality of non-fungible tokens based on attributes of the plurality of respective primary interactions associated with the plurality of clusters, wherein the plurality of non-fungible tokens are configured to identify the plurality of respective clusters;
store the plurality of clusters in the memory;
receive, via a web service executing on a user device, a request to process an input primary interaction;
determine an interaction type associated with the input primary interaction;
generate a non-fungible token associated with the input primary interaction based on the interaction type;
embed the generated non-fungible token in the request and transmit the embedded request to the memory;
within the memory,
compare the non-fungible token embedded in the request to the plurality of non-fungible tokens respectively identifying the plurality of clusters;
select a first cluster from the plurality of clusters based on a match between the non-fungible token associated with the input primary interaction and a first non-fungible token identifying the first cluster; and determine the one or more secondary interactions in the first cluster as linked to the input primary interaction;
retrieve the one or more secondary interactions linked to the input primary interaction from the plurality of clusters;
generate a recommended group of interactions comprising the input primary interaction and the one or more retrieved secondary interactions;
encrypt the recommended group of interactions and an indication that the one or more retrieved secondary interactions are linked to the input primary interaction into an encrypted response; and
provide, via the web service, the encrypted response operable to be decrypted to extract the recommended group of interactions and the indication that the one or more retrieved secondary interactions are linked to the input primary interaction.

2. The system of claim 1, wherein the input primary interaction is associated with one or more attributes, and wherein the non-fungible token associated with the input primary interaction comprises a combination of one or more character-strings respectively representing the one or more attributes.

3. The system of claim 1, wherein determining the interaction type associated with the input primary interaction comprises:
determining, by a natural-language processing (NLP) model, one or more attributes associated with the input primary interaction based on metadata associated with the input primary interaction; and
analyzing the one or more attributes by the NLP model to determine the interaction type associated with the input primary interaction, wherein the NLP model is configured to output an interaction type based on one or more input attributes to the NLP model.

4. The system of claim 1, wherein the machine-learning model comprises
an unsupervised deep-learning model comprising one or more graphical neural networks, and wherein the interaction group patterns indicate a plurality of linkages between historical primary interactions and historical secondary interactions.

5. The system of claim 1, wherein the processor is further configured to:
determine, for each of the plurality of primary interactions associated with the plurality of clusters, a respective interaction type associated with the primary interaction; and
wherein generating the plurality of non-fungible tokens associated with the plurality of clusters is further based on the interaction types associated with the primary interactions.

6. The system of claim 1, wherein the processor is further configured to:
access current interaction data from one or more logs;
compare the recommended group of interactions with the current interaction data;
predict one or more additional secondary interactions not yet received at the system based on the comparison, wherein the one or more additional secondary interactions are linked to the input primary interaction; and
provide, via the web service, the predicted one or more additional secondary interactions.

7. A method, comprising:
training a machine-learning model on historical interaction data comprising at least a historical group of manually linked interactions for a first period of time, wherein the manually linked interactions comprise one or more historical primary interactions and one or more historical secondary interactions linked to each of the one or more historical primary interactions, the training of the machine-learning model automatically generating a plurality of clusters indicating interaction group patterns from the historical interaction data, wherein each of the plurality of clusters comprises a respective primary interaction and one or more secondary interactions linked to that primary interaction;
generating a plurality of non-fungible tokens based on attributes of the plurality of respective primary interactions associated with the plurality of clusters, wherein the plurality of non-fungible tokens are configured to identify the plurality of respective clusters;
storing the plurality of clusters in a memory;
receiving, via a web service executing on a user device, a request to process an input primary interaction;
determining an interaction type associated with the input primary interaction;
generating a non-fungible token associated with the input primary interaction based on the interaction type;
embedding the generated non-fungible token in the request and transmitting the embedded request to the memory;
within the memory,
comparing the non-fungible token embedded in the request to the plurality of non-fungible tokens respectively identifying the plurality of clusters;
selecting a first cluster from the plurality of clusters based on a match between the non-fungible token associated with the input primary interaction and a first non-fungible token identifying the first cluster; and
determining the one or more secondary interactions in the first cluster as linked to the input primary interaction;
retrieving the one or more secondary interactions linked to the input primary interaction from the plurality of clusters;
generating a recommended group of interactions comprising the input primary interaction and the one or more retrieved secondary interactions; and
encrypting the recommended group of interactions and an indication that the one or more retrieved secondary interactions are linked to the input primary interaction into an encrypted response; and
providing, via the web service, the encrypted response operable to be decrypted to extract the recommended group of interactions and the indication that the one or more retrieved secondary interactions are linked to the input primary interaction.

8. The method of claim 7, wherein the input primary interaction is associated with one or more attributes, and wherein the non-fungible token associated with the input primary interaction comprises a combination of one or more character-strings respectively representing the one or more attributes.

9. The method of claim 7, wherein determining the interaction type associated with the input primary interaction comprises:
determining, by a natural-language processing (NLP) model, one or more attributes associated with the input primary interaction based on metadata associated with the input primary interaction; and analyzing the one or more attributes by the NLP model to determine the interaction type associated with the input primary interaction, wherein the NLP model is configured to output an interaction type based on one or more input attributes to the NLP model.

10. The method of claim 7, wherein the machine-learning model comprises
an unsupervised deep-learning model comprising one or more graphical neural networks, and wherein the interaction group patterns indicate a plurality of linkages between historical primary interactions and historical secondary interactions.

11. The method of claim 7, further comprising:
determining, for each of the plurality of primary interactions associated with the plurality of clusters, a respective interaction type associated with the primary interaction; and
wherein generating the plurality of non-fungible tokens associated with the plurality of clusters is further based on the interaction types associated with the primary interactions.

12. The method of claim 7, further comprising:
accessing current interaction data from one or more logs;
comparing the recommended group of interactions with the current interaction data;
predicting one or more additional secondary interactions not yet received at the one or more computing systems based on the comparison, wherein the one or more additional secondary interactions are linked to the input primary interaction; and
providing, via the web service, the predicted one or more additional secondary interactions.

13. A non-transitory computer-readable medium storing instructions that when executed by a processor cause the processor to:
train a machine-learning model on historical interaction data comprising at least a historical group of manually linked interactions for a first period of time, wherein the manually linked interactions comprise one or more historical primary interactions and one or more historical secondary interactions linked to each of the one or more historical primary interactions, the training of the machine-learning model automatically generating a plurality of clusters indicating interaction group patterns from the historical interaction data, wherein each of the plurality of clusters comprises a respective primary interaction and one or more secondary interactions linked to that primary interaction;
generate a plurality of non-fungible tokens based on attributes of the plurality of respective primary interactions associated with the plurality of clusters, wherein the plurality of non-fungible tokens are configured to identify the plurality of respective clusters;
store the plurality of clusters in a memory;
receive, via a web service executing on a user device, a request to process an input primary interaction;
determine an interaction type associated with the input primary interaction;
generate a non-fungible token associated with the input primary interaction based on the interaction type;
embed the generated non-fungible token in the request and transmit the embedded request to the memory;
within the memory,
compare the non-fungible token embedded in the request to the plurality of non-fungible tokens respectively identifying the plurality of clusters;
select a first cluster from the plurality of clusters based on a match between the non-fungible token associated with the input primary interaction and a first non-fungible token identifying the first cluster; and
determine the one or more secondary interactions in the first cluster as linked to the input primary interaction;
retrieve the one or more secondary interactions linked to the input primary interaction from the plurality of clusters;
generate a recommended group of interactions comprising the input primary interaction and the one or more retrieved secondary interactions;
encrypt the recommended group of interactions and an indication that the one or more retrieved secondary interactions are linked to the input primary interaction into an encrypted response; and
provide, via the web service, the encrypted response operable to be decrypted to extract the recommended group of interactions and the indication that the one or more retrieved secondary interactions are linked to the input primary interaction.

14. The non-transitory computer-readable medium of claim 13, wherein the input primary interaction is associated with one or more attributes, and wherein the non-fungible token associated with the input primary interaction comprises a combination of one or more character-strings respectively representing the one or more attributes.

15. The non-transitory computer-readable medium of claim 13, wherein the instructions further cause the processor to:
determine, by a natural-language processing (NLP) model, one or more attributes associated with the input primary interaction based on metadata associated with the input primary interaction; and
analyze the one or more attributes by the NLP model to determine the interaction type associated with the input primary interaction, wherein the NLP model is configured to output an interaction type based on one or more input attributes to the NLP model.

16. The non-transitory computer-readable medium of claim 13, wherein the machine-learning model comprises
an unsupervised deep-learning model comprising one or more graphical neural networks, and wherein the interaction group patterns indicate a plurality of linkages between historical primary interactions and historical secondary interactions.

17. The non-transitory computer-readable medium of claim 13, wherein the instructions further cause the processor to:
determine, for each of the plurality of primary interactions associated with the plurality of clusters, a respective interaction type associated with the primary interaction; and
wherein generating the plurality of non-fungible tokens associated with the plurality of clusters is further based on the interaction types associated with the primary interactions.

18. The non-transitory computer-readable medium of claim 13, wherein the instructions further cause the processor to:
access current interaction data from one or more logs;
compare the recommended group of interactions with the current interaction data;
predict one or more additional secondary interactions not yet received at a system associated with the one or more logs based on the comparison, wherein the one or more additional secondary interactions are linked to the input primary interaction; and provide, via the web service, the predicted one or more additional secondary interactions.

\* \* \* \* \*